H. H. WESTINGHOUSE.
Vacuum-Brake Hose-Coupling.
No. 214,334. Patented April 15, 1879.
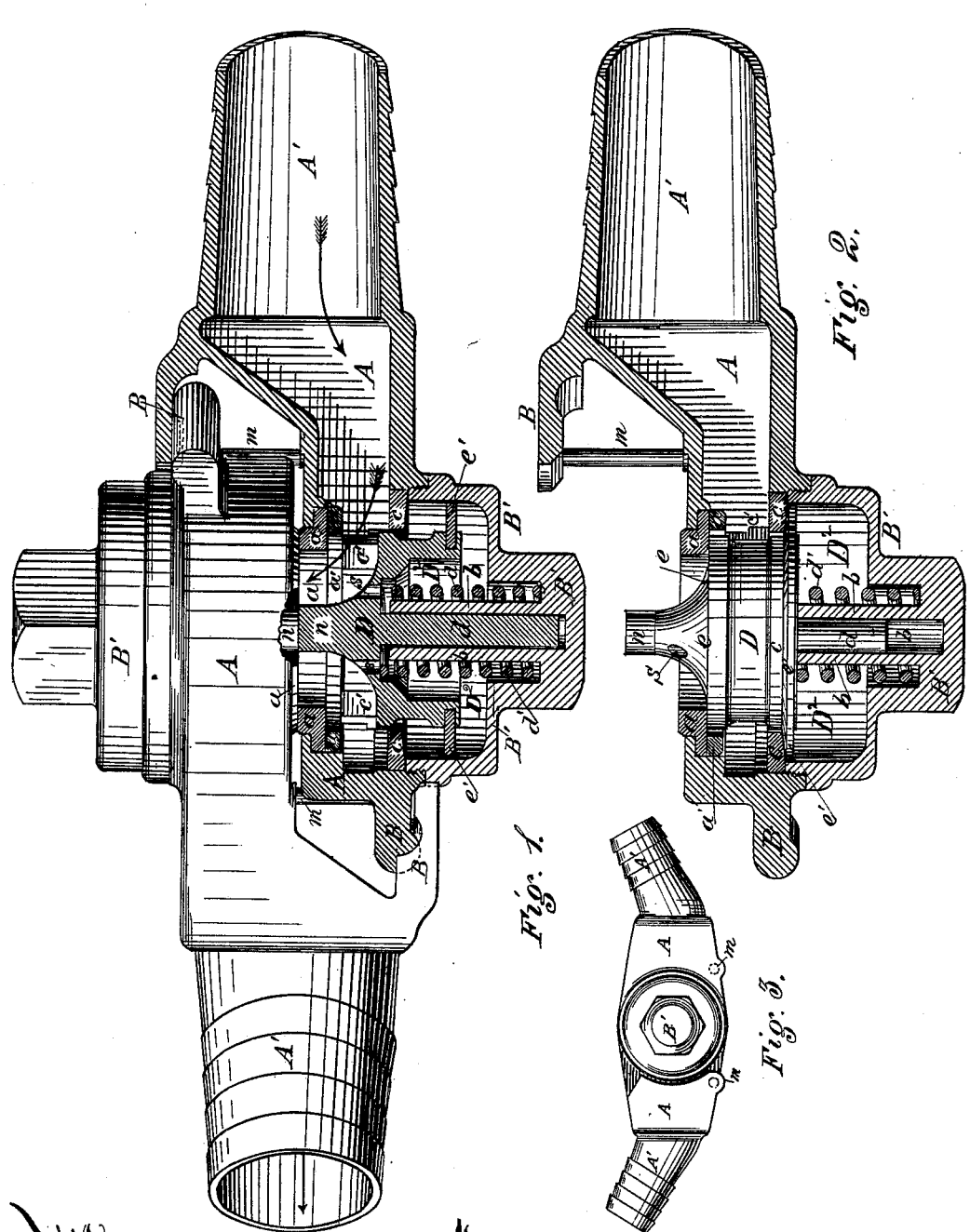

UNITED STATES PATENT OFFICE.

HENRY H. WESTINGHOUSE, OF PITTSBURG, PA., ASSIGNOR TO THE WESTINGHOUSE AIR BRAKE COMPANY, OF SAME PLACE.

IMPROVEMENT IN VACUUM-BRAKE HOSE-COUPLINGS.

Specification forming part of Letters Patent No. 214,334, dated April 15, 1879; application filed March 10, 1879.

*To all whom it may concern:*

Be it known that I, HENRY H. WESTINGHOUSE, of Pittsburg, county of Allegheny, State of Pennsylvania, have invented or discovered a new and useful Improvement in Vacuum-Brake Hose-Couplings; and I do hereby declare the following to be a full, clear, concise, and exact description thereof, reference being had to the accompanying drawings, making a part of this specification, in which— like letters indicating like parts—

Figure 1 shows a pair of my improved couplings coupled together or united for use, one part or half of the pair being shown in edge view and the other in section. Fig. 2 is a like sectional view of one half uncoupled, but showing the valve in elevation and closed or seated; and Fig. 3, by a reduced view of the coupling in elevation, shows the angle of the nozzles.

The coupling-shells A and nozzles A', as also the automatically-detachable curved hook and bead-fastenings B, stop-posts $m$, and packing-rings $a$ in the lateral overlapping parts, are all made and operated substantially as in reissued Letters Patent No. 8,291, granted to George Westinghouse, Jr., June 18, 1878, except that the nozzles are made to extend angularly from the main parts of the coupling, so that when two are attached, as in Fig. 3, and suspended by flexible hose from the fixed pipes under the cars, in the usual way, such nozzles, instead of extending out horizontally, will take the general inclination of the flexible hose, so as to avoid an abrupt angle in the hose at the extremity of the nozzle. Such angle in the hose has a tendency to crack the same before the rest of the hose is worn out.

The present invention differs, however, in other respects from that described in said Reissue No. 8,291 in certain features, whereby the coupling is adapted to be used in coupling up the flexible hose of vacuum-brake pipes in such manner that when the couplings are disconnected the valves therein will be held to their seats partly or wholly by atmospheric pressure, (the vacuum or partial vacuum being "on,") and when coupled the valves will unseat each other. I also make the couplings alike, so that each shall be the counterpart of the other.

Back of each packing-ring $a$ is a stiff metallic ring, $a'$, held down to its place (and holding the packing-ring in place) by posts $c'$, projecting from a ring, $c$, and the cap B' bears on the latter. In the axial line of the cap B' a tubular socket, $b$, or equivalent guides, projects inwardly, within which works a guiding-stem, $d$, of the valve D. This valve is preferably somewhat of a cup shape, open on its inner end, and with one, two, or more ports, $s\ s$, through the outer end, or that which constitutes the bottom of the cup.

At $e$ is a valve-face, which seats on the packing-ring $a$ when the valve is closed, as shown in Fig. 2; and in the opposite end of the valve I make a groove, in which I arrange gasket $e'$, of india-rubber or other suitable material, which, when the valve is seated, rests or laps on the ring $c$, so as to make a packed joint therewith, as also shown in Fig. 2.

From the forward or outer side of the valve a stem, $n$, projects a distance equal to the throw or motion desired to be given to the valve in opening the same. This stem is in the axial line of the main port through the packing-ring $a$, so that when two half-couplings are brought together in the act of coupling the stems $n\ n$ of the two valves will come together end to end, as in Fig. 1, and thereby each valve will be thrown back off its seat or seats, as also shown in Fig. 1, and thereby make a thorough passage-way for the exhaustion of air, as indicated by the arrows; but if, while the air is thus being exhausted, the couplings should become separated by accident or otherwise, external air-pressure, acting through the ports $s$, will become operative in the chamber $D^2$.

A spring, $d'$, is provided, if necessary, to throw the valve to its seat. As soon as the valve is seated the area of valve-surface at its inner end, or next the chamber $D^2$, subject to atmospheric pressure becomes greater than the exposed area at the other end—that is, through the port of the ring $a$. The result will be that the valve will be closed to the position shown in Fig. 2, and kept closed by the preponderance of air-pressure in $D^2$. When the valve is in this position external air cannot enter the passage-ways or chambers, within which an operative vacuum or partial vacuum is created or maintained.

It will be observed that the gasket $e'$, being flexible, will make a tight joint with the ring $c$, even though the packing-ring $a$ may give or be worn away somewhat, as it is liable to do in use.

The valve thus described may be designated in general terms as a cylindrical valve having two annular seats or packed joints, (when closed,) one of which closes the air-port proper, and the other is so made that when closed the valve is subject to a preponderance of air-pressure on that side or end such as to keep it down or closed; and it will be within the limits of the present invention to apply such valve to any form or construction of lap-joint coupling, or to any coupling wherein the air in being exhausted takes a circuitous path or motion in passing from one half-coupling to the next, since this feature of coupling construction enables me to arrange the air-chamber $D^2$ to one side of the path or through flow of the air, instead of in the direct line of such flow, as heretofore; and a coupling-valve having, when closed, different areas of end surface exposed to external air-pressure, so as to be held thereby to its seat when subject to the action of a vacuum, or partial vacuum, in the manner described, I believe to be new in vacuum-brake couplings.

The ports for supplying air to the chamber $D^2$ may be made through the cap, in connection with suitable means for opening and closing the same as the couplings are disconnected or united; and, if found desirable, the end of the stem $n$ may be made broad like a knob or button, so as to prevent the possibility (if the spring $d'$ be made stiff) of the end of one stem catching inside the ring $a$ of the opposite half-coupling when they are forcibly disconnected.

I do not limit myself to exact form or construction, but include herein known modifications, immaterial variations, and mechanical equivalents.

I claim herein as my invention—

1. In combination, with a lap-joint coupling, an air-chamber, $D^2$, arranged outside of or laterally to the through passage-way for the exhaustion of the air, an air-port for supplying air thereto when the valve is closed, and a valve having a projecting stem, $n$, and two seats or equivalent packed joints, substantially as set forth.

2. In a half-coupling, a valve, D, seating when closed on a packing-ring, $a$, and having a gasket, $e'$, at its opposite end, which seats on a fixed ring, $c$, so as to give to such end of the valve a preponderance of air-pressure at such end when closed, in combination with air-chamber $D^2$ back of the valve, substantially as set forth.

3. As an improvement in couplings for flexible hose of brake-pipes, the nozzles $A'$, angularly constructed as regards the shells, substantially as set forth.

In testimony whereof I have hereunto set my hand.

HENRY H. WESTINGHOUSE.

Witnesses:
 GEORGE H. CHRISTY,
 R. H. WHITTLESEY.